(12) United States Patent
Gnauck et al.

(10) Patent No.: US 6,509,993 B1
(45) Date of Patent: Jan. 21, 2003

(54) OPTICAL TRANSMISSION USING DISPERSION-ENHANCED SIGNALS

(75) Inventors: Alan H. Gnauck, Middletown, NJ (US); Sang-Gyu Park, Tinton Falls, NJ (US); Jay Wiesenfeld, Lincroft, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/398,874

(22) Filed: Sep. 20, 1999

(51) Int. Cl.[7] .............................................. H04B 10/00
(52) U.S. Cl. ..................... 359/161; 359/181; 359/122; 359/124
(58) Field of Search ................................ 359/161, 181, 359/173, 179, 188, 122, 124; 385/123

(56) References Cited

U.S. PATENT DOCUMENTS

| | | | | |
|---|---|---|---|---|
| 5,218,662 A | * | 6/1993 | Dugan .......................... | 359/161 |
| 5,224,183 A | * | 6/1993 | Dugan .......................... | 359/124 |
| 5,446,574 A | * | 8/1995 | Djupsjobacka et al. ..... | 359/181 |
| 5,539,563 A | * | 7/1996 | Park ............................. | 359/161 |
| 5,559,920 A | | 9/1996 | Chraplyvy et al. .......... | 385/123 |
| 5,608,562 A | * | 3/1997 | Delavaux et al. ............ | 359/161 |
| 5,828,478 A | * | 10/1998 | Thomine et al. ............ | 359/181 |
| 6,178,021 B1 | * | 1/2001 | Bruyere et al. ............. | 359/122 |

OTHER PUBLICATIONS

D. Breuer et al., "Comparison of N×40 Gb/s and 4N×10 Gb/s WDM Transmission Over Standard Single–Mode Fiber at 1.55 μm," *IEEE Photonics Technology Letters*, vol. 10, N0. 12, Dec. 1998, pp. 1793–1795.

A. H. Gnauck et al., "Dispersion Compensation for Optical Fiber Systems," *Optical Fiber Telecommunications*, Chapter 7, vol. IIIA, 1997, pp. 162–195.

F. Forghieri et al., "Fiber Nonlinearities and Their Impact on Transmission Systems," *Optical Fiber Telecommunications*, Chapter 8, vol. IIIA, 1997, pp. 196–264.

D. Breuer et al., "Combatting Fibre Nonlinearity In Symmetrical Compensation Schemes Using RZ–Modulation Format At 120 km Amplifier Spacing Over Standard Fibre," *ECOC 97, IEE Conference Publication No. 448*, Sep. 22–25, 1997, pp. 261–264.

D. Breuer et al., "Comparison of NRZ– and RZ–Modulaiton Format for 40–Gb/s TDM Standard–Fiber Systems," *IEEE Photonics Technology Letters*, vol. 9, No. 1, Mar. 1997, pp. 398–400.

R. W. Tkach et al., "Transmission of Eight 20–Gb/s Channels Over 232 km of Conventional Single–Mode Fiber," *IEEE Photonics Technology Letters*, vol. 7, No. 11, Nov. 1995, pp. 1369–1371.

\* cited by examiner

*Primary Examiner*—John Tweel
(74) *Attorney, Agent, or Firm*—Oliff & Berridge, PLC

(57) ABSTRACT

An optical transmission system and method uses large-bandwidth optical signals that rapidly disperse in a transmission medium, such as an optical fiber, to reduce the effects of non-linearities in the transmission medium on the optical signal. The frequency bandwidth of the optical signals can be widened by chirping the optical signals, although other methods are possible. Optical signals in adjacent channels, such as in wavelength division multiplexing, can overlap to some extent without significant effect on the transmitted signal quality. Optical filtering at the receiver can extract partially overlapping signals as well as compensate for residual dispersion and/or dispersion slope in the transmission system.

30 Claims, 9 Drawing Sheets

OPTICAL TRANSMISSION USING DISPERSION-ENHANCED SIGNALS

BACKGROUND OF THE INVENTION

1. Field of Invention

This invention relates to optical transmission systems and methods.

2. Description of Related Art

The performance of optical communication systems using optical fiber is constrained by noise accumulated in passing through optical amplifiers in the communication system, and by non-linear effects on transmitted signals that are launched with a high signal power. High initial signal power is desirable to overcome accumulated noise, but high initial signal power also tends to increase the effects of fiber non-linearity on the signal. Thus, a balance between signal power, noise and non-linear effects on the signal is required.

The effects of fiber non-linearity can be controlled to some extent by proper management of chromatic dispersion in the transmission system, such as that described in U.S. Pat. No. 5,559,920 to Chraplyvy et al. Typical dispersion management techniques attempt to keep the overall dispersion near zero while keeping the local dispersion away from zero to control non-linear effects. However, the accumulated dispersion at any point is restricted to levels such that the data pulses never become severely distorted.

Other techniques to overcome deleterious non-linear effects have also been demonstrated. Soliton transmission, for example, balances the combined effects of nonlinearity and dispersion to maintain optical pulse integrity. The widening effect of dispersion is balanced by the peaking effect of the non-linearity, so that the optical pulses propagate nearly unchanged. A similar technique, referred to as "chirped RZ" transmission, adds small amounts of phase modulation to the pulses, again with the intention of maintaining the pulse shape as undisturbed as possible.

SUMMARY OF THE INVENTION

The invention provides an optical communication system and method that reduces the effect of non-linearities on a transmitted signal. The invention works on a principle opposite to those described above, by rapidly dispersing the transmitted optical pulses. In one aspect of the invention, transmitted signals and/or the transmission system are arranged so that the transmitted signals disperse rapidly in the transmission medium. For example, a transmitted signal can be generated to have a relatively high number of constituent frequencies, i.e., a wide frequency bandwidth. We define a "dispersion-enhanced" signal to be one which occupies a frequency bandwidth wider than that required for a given bitrate, e.g., 2*bitrate for a conventional non-return to zero (NRZ) signal, for the express purpose of reducing the dispersion length. When this dispersion-enhanced signal is launched into the transmission medium, e.g., a conventional optical fiber, chromatic dispersion in the transmission medium causes the different frequencies to propagate at different speeds, thereby dispersing the signal. At a bitrate of 40 gigabits per second (40 Gb/s) where the bit period is 25 picoseconds (ps), a dispersion-enhanced signal having a relatively wide frequency bandwidth can be created, for example, by constructing the signal from very narrow pulses, e.g., 3-ps pulses. The dispersion-enhanced signal can also be created by "chirping" the conventional signal (adding extra frequency spectrum through additional phase or frequency modulation), or by using a light source that has a broadened linewidth, e.g., 40–200 GHz or broader. The transmission system can also include components that disperse a transmitted signal rapidly. For example, an optical fiber link in the system can have an amount of chromatic dispersion that causes a dispersion-enhanced signal or other standard signal to disperse rapidly. Other components of the system can receive standard communication signals, and alter the signals so that the signal is dispersion-enhanced, e.g., has a wide frequency bandwidth.

Although the optical transmission system has one or more portions that cause a signal to rapidly disperse, the system can also incorporate dispersion compensation to reverse the effects of dispersion on a signal. For example, an optical transmission fiber having a given chromatic dispersion that is used to transmit a signal can provide the signal to a dispersion compensating fiber that has a chromatic dispersion opposite the transmission fiber. Thus, while the transmission fiber causes the signal to be broadly dispersed, the compensating fiber can cause the signal to be drawn back together into a more well-defined, non-dispersed signal so that it can be properly received.

The optical transmission system and method can also mitigate the effects of residual dispersion and dispersion slope in the transmission system, for example, by performing optical filtering at receiver portions of the system. Dispersion in the system causes different wavelengths of light to experience different propagation speeds. Dispersion slope in the system causes different wavelengths of light to experience different amounts of dispersion compared to other wavelengths. By appropriate narrow filtering of the dispersion-compensated signals, dispersion and dispersion slope in the transmission system need not be perfectly compensated.

Proper optical filtering at a receiver portion can also allow close channel spacing, e.g., for wavelength-division multiplexing, and even allow some overlap between adjacent channels. That is, even though the frequency content of adjacent channels may overlap somewhat, proper optical filtering can select the information from a desired channel without a significant effect on signal quality.

These and other aspects of the invention will be apparent and/or obvious from the following detailed description.

BRIEF DESCRIPTION OF THE DRAWINGS

The invention is described in detail with regard to the following figures wherein like numerals reference like elements, and wherein.

DETAILED DESCRIPTION OF PREFERRED EMBODIMENTS

Figure 1:
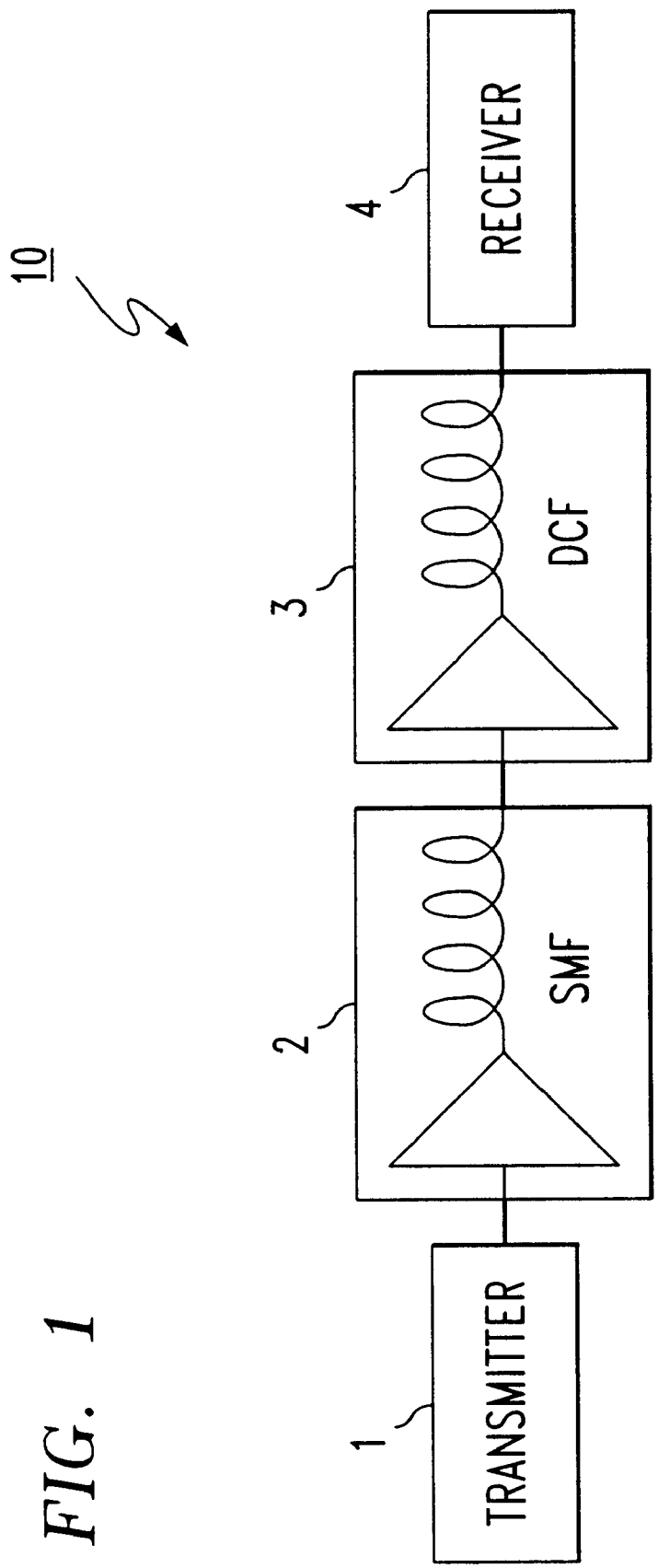
FIG. 1 is a schematic block diagram of an optical communication system.

FIG. 1 shows a schematic block diagram of an optical communication system 10. A transmitter 1 generates and transmits optical signals, e.g., a series of modulated optical pulses having a desired frequency band, to an optical transmission link 2 that carries the input signals a desired transmission distance. In this example, the transmission link 2 includes conventional non-dispersion shifted fiber, i.e., single-mode fiber (SMF), or non-zero dispersion shifted fiber having a dispersion of, for example, ±3 picosecond/nanometer/kilometer (ps/nm/km), as well as amplifiers and other signal handling devices, which are well known in the art and are not described in detail here. The transmitted signals are then provided to a dispersion compensating link 3, that compensates for the dispersion of the transmitted signals caused by the transmission link 2. The dispersion compensating link 3 can also include one or more amplifiers or other signal handling devices, as are well known. The transmitted signals are then received at a receiver 4, which can include amplifiers, optical filters, photodiodes that convert received optical signals to electrical signals, electrical filters or other electronic data processing devices. As with the transmission link 2 and the dispersion compensating link 3, details of the receiver 4 can vary widely and are generally well known in the art; thus, details of these elements are not provided here.

As discussed above, the transmitter 1 generates transmission signals so that the signals rapidly disperse in the transmission link 2, thereby minimizing the effect of non-linearities in the transmission link 2. The non-linear effects on a transmitted signal can be manifested as intensity-dependent gain or loss in the signal, i.e., known as stimulated scattering, and/or intensity-dependent phase effects caused by a non-linear index of refraction in the fiber. Details regarding such non-linear effects are provided in *Optical Fiber Telecommunications*, Vol. 3a, Chapter 8, "Fiber Non-linearities and Their Impact on Transmission Systems," by F. Forghieri et al., 1997. The inventors have discovered that by rapidly dispersing a transmitted signal in the transmission link 2, non-linear effects on the transmitted signal can be reduced. The non-linear effects are reduced because when a transmitted signal is quickly dispersed, frequency components of the signal are not well phase-matched, pulse transitions are maintained only briefly, and the fiber non-linearity has little chance to operate on the signal.

Various approaches can be taken to cause a transmission signal to be rapidly dispersed in the transmission link 2. One approach is to increase the frequency bandwidth of the transmission signal, such as by narrowing a pulse width of the signal, chirping the signal, and/or using a light source having a broadened linewidth. This causes the signal to have a broad frequency spectrum and thus makes the signal dispersion-enhanced. Dispersion in the transmission link 2 acts differently on the different frequency components of the dispersion-enhanced signal, thus rapidly dispersing the signal. Narrowing a pulse width, chirping a transmission signal and using a light source having a broad frequency spectrum are only three ways to increase the frequency bandwidth of the signal, and a combination of these methods or other suitable methods may be used to achieve the same result. Alternatively (or in addition), the dispersion in the optical transmission fiber could be increased.

A light source having a broadened linewidth can include various elements to generate an optical signal having a broad frequency spectrum. For example, a laser light source having a relatively broad frequency spectrum of 40–200 GHz or broader can be used to generate transmission signals. Alternately, a light source, such as an optical amplifier or light emitting diode (LED), having a very broad spectrum, e.g., 1–20 nm or more, can be spectrally sliced so that only a ion of the spectrum generated by the light source is used to generate an optical signal. For example, optical filtering can be used to select a desired frequency band of the light output by the light source. This can then be modulated to produce the transmission signal. When a transmission signal is generated using a light source having a broadened line width, the transmission signal need not be otherwise modified, such as by narrowing pulse width or chirping, to ensure that the signal rapidly disperses in the transmission link 2. Instead, the transmission signal can be made to have a standard pulse width and other standard signal features without sacrificing received signal quality as a result of fiber non-linearities.

Figure 2:
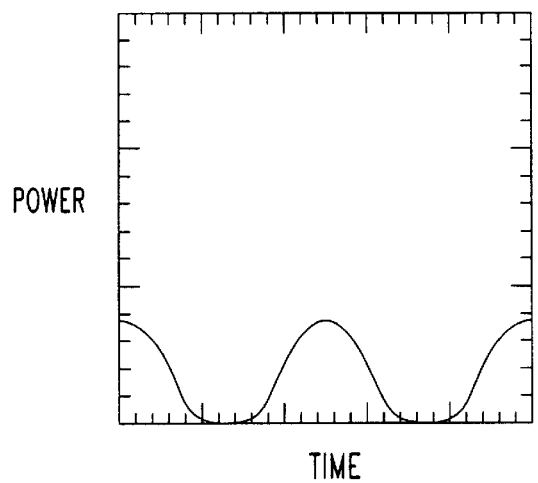
FIGS. 2–4 each show eye diagrams of exemplary 40 Gb/s optical signals.
Figure 3:
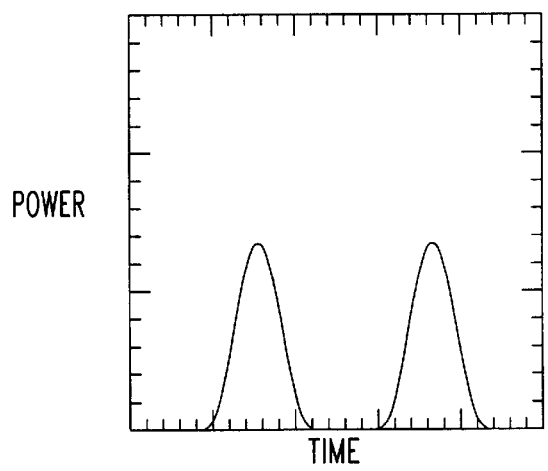
Figure 4:
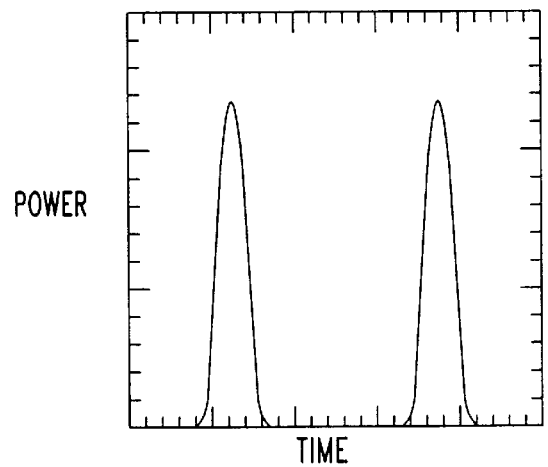

FIGS. 2–4 show computer simulations of three exemplary 40-Gbit/s transmission signals having different pulse widths, but a same average power of 8 mW. The transmission signal in FIG. 2 has a pulse width of approximately 12 ps, the signal in FIG. 3 has a pulse width of 6 ps, and the signal in FIG. 4 has a pulse width of 3 ps. For these signals, the spectral bandwidth varies inversely with the pulse width, and is largest for the 3-ps pulses.

Figure 5:
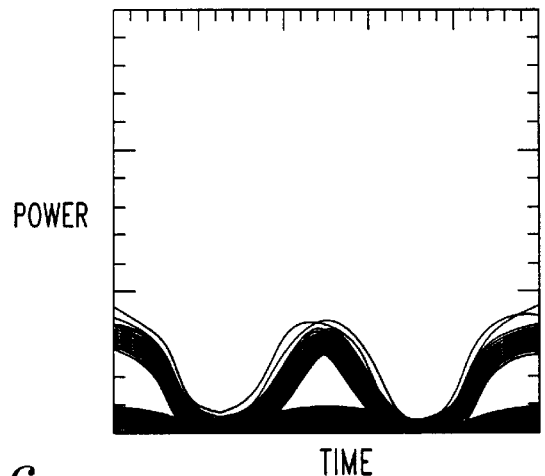
FIGS. 5–7 each show signals received after each of the signals in FIGS. 2–4, respectively, have been transmitted over 480 km of conventional optical fiber and subsequently dispersion compensated.
Figure 6:
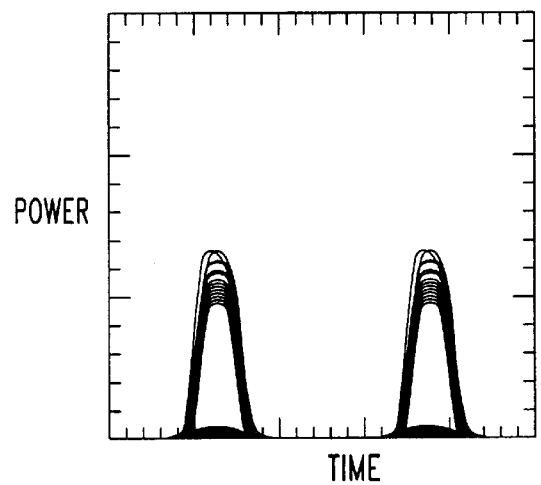
Figure 7:
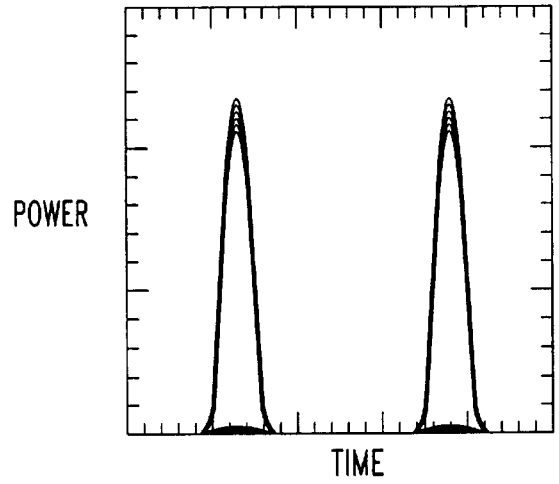

The signals in FIGS. 2–4 were transmitted through identical systems having an equivalent transmission distance of 480 km through conventional optical fiber. The link consisted of six spans of 80 km each, and optical amplifiers provided 8 mW average power at the input to each span. Complete dispersion- and dispersion slope-compensation was performed. FIGS. 5–7 show the received signals after transmission for each of the transmission signals in FIGS. 2–4, respectively. As can be seen, the received signals for the narrower pulse width transmission signals of FIGS. 3 and 4 are more well-defined than the wider 12 ps signal of FIG. 2. A more well-defined received signal means that signal integrity is insured, and that bit error-rates are decreased. The better definition exhibited in the received signal shown in FIG. 7, for example, is attributed to the rapid dispersion of the transmission signal shown in FIG. 4 in the transmission system and the corresponding reduced effect of non-linearities on the signal.

Figure 8:
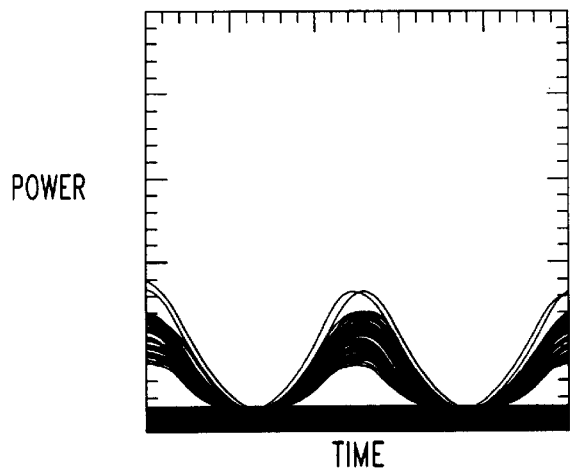
FIGS. 8–10 show signals resulting after the received signals shown in FIGS. 5–7, respectively, are low pass filtered in the electrical domain.
Figure 9:
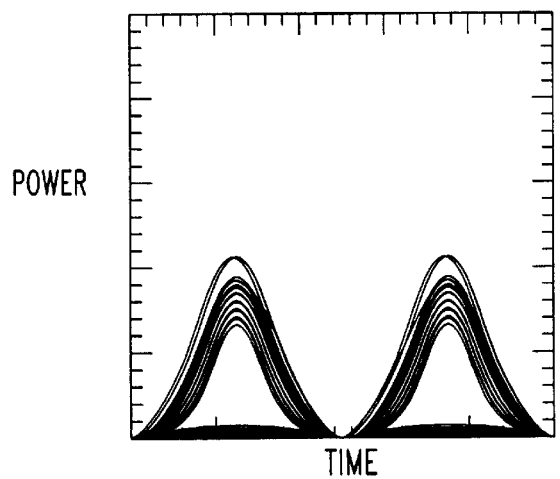
Figure 10:
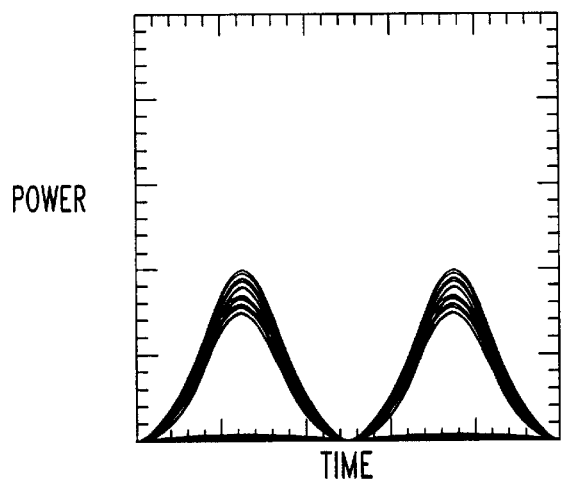

FIGS. 8–10 show the received signals of FIGS. 5–7, respectively, after being filtered with a 30 GHz low pass electrical filter, as would occur in a typical 40 Gbit/s receiver. As can be seen, the filtered signal shown in FIG. 10 is much more well-defined than that of FIGS. 8 or 9.

Figure 11:
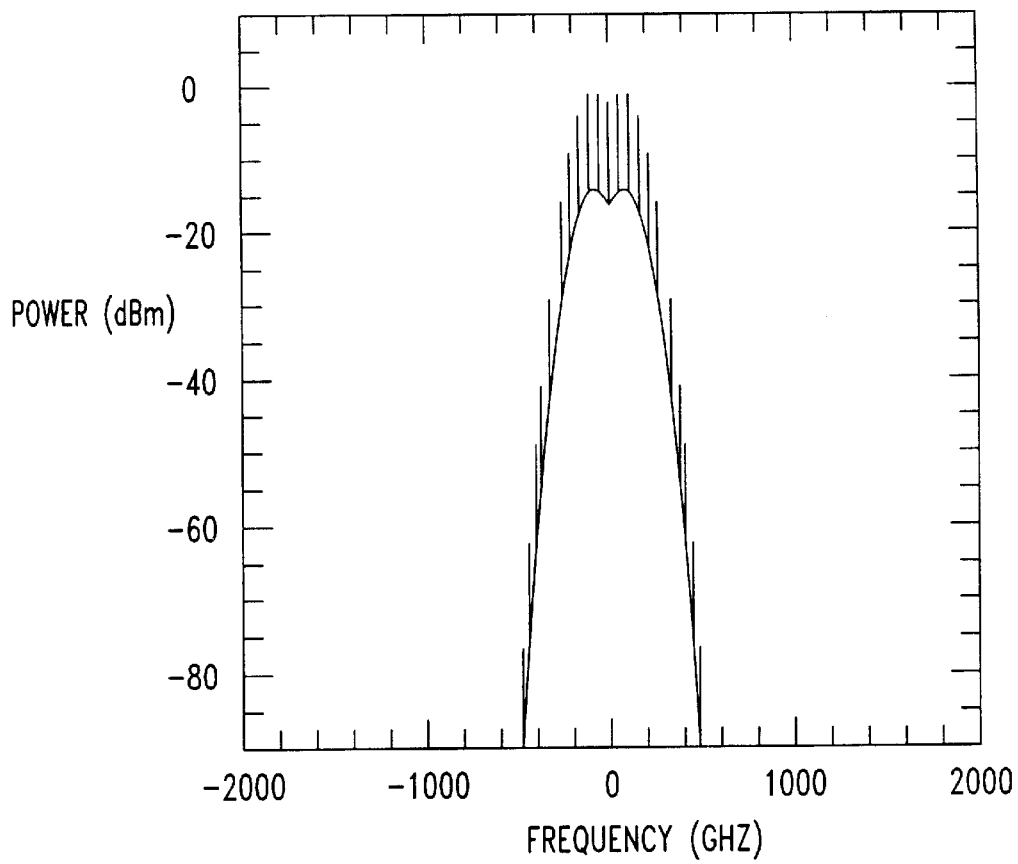
FIG. 11 shows the spectrum of an exemplary chirped signal.

The comparison provided in connection with FIGS. 2–10 involves signals that are simply narrowed in pulse width to dispersion-enhance the signals, i.e., increase the frequency spectrum of the transmission signals. FIG. 11 shows the spectrum of another type of transmission signal having a broad frequency spectrum. In this example, the transmission signal has a relatively wide pulse width of 50% of the bit period, e.g., 12 ps, and has an average power of 8 mW, but has also been "chirped" to increase the frequency content of the signal. This was accomplished by adding additional phase modulation onto the signal. One advantage of chirping a transmission signal is that the signal need not have a relatively narrow pulse width, which can require specialized transmitter 1 equipment. A chirped signal, such as that shown in FIG. 11, can have a pulse width of standard optical signals, and thus be generated using only slightly modified conventional transmitter 1 equipment. For example, the transmitter 1 can be run in such a way as to produce additional phase modulation or a phase modulator can be added to the transmitter 1.

Figure 12:
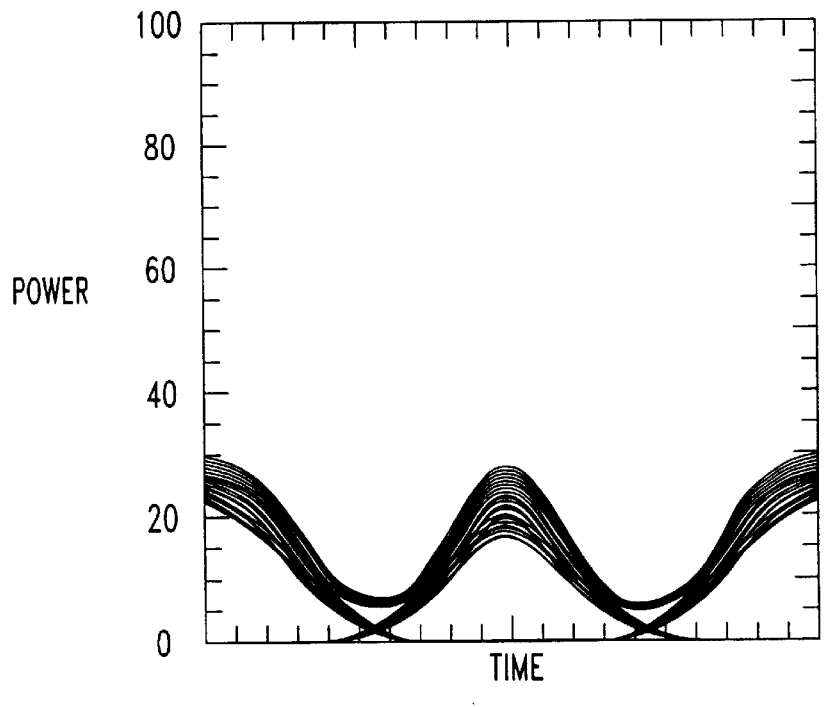
FIG. 12 is an exemplary eye diagram corresponding to the chirped signal shown in FIG. 11 after transmission over 480 km of conventional optical fiber and subsequent dispersion compensation.

FIG. 12 shows a signal received in response to transmitting the signal shown in FIG. 11 through an identical system to that used in connection with FIG. 8 above. As can be seen, even though the transmission signal in FIG. 11 has a relatively wide pulse width of 12 ps, the received and filtered signal shown in FIG. 12 is much more well-defined than that shown in FIG. 8.

Figure 13:
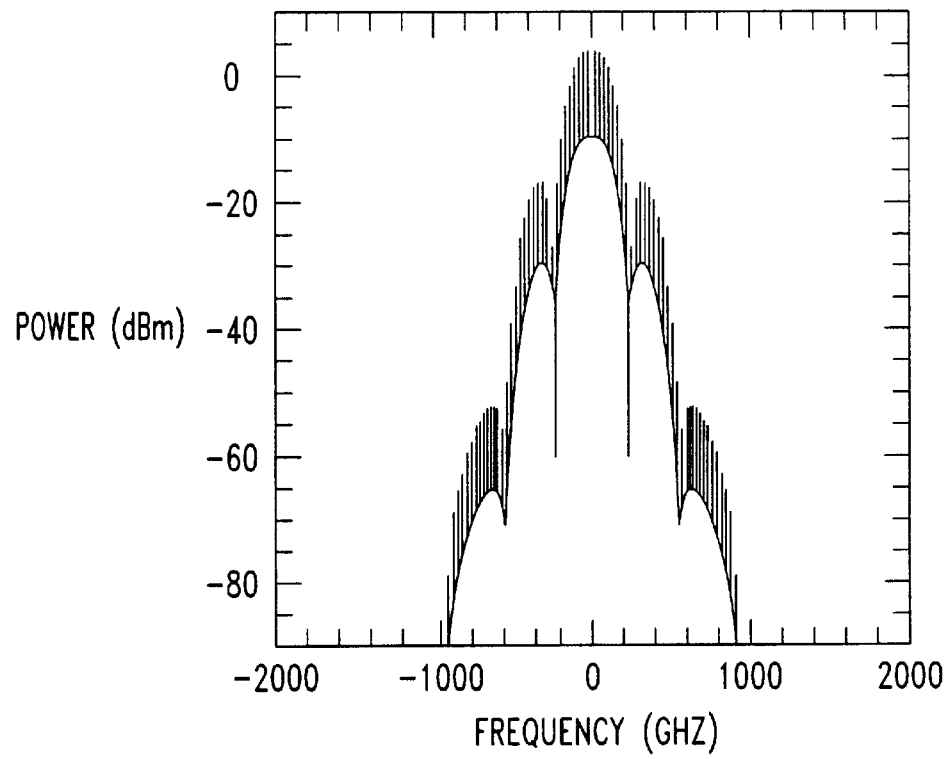
FIG. 13 shows the spectrum of a single-channel signal having 3 ps pulses.
Figure 14:
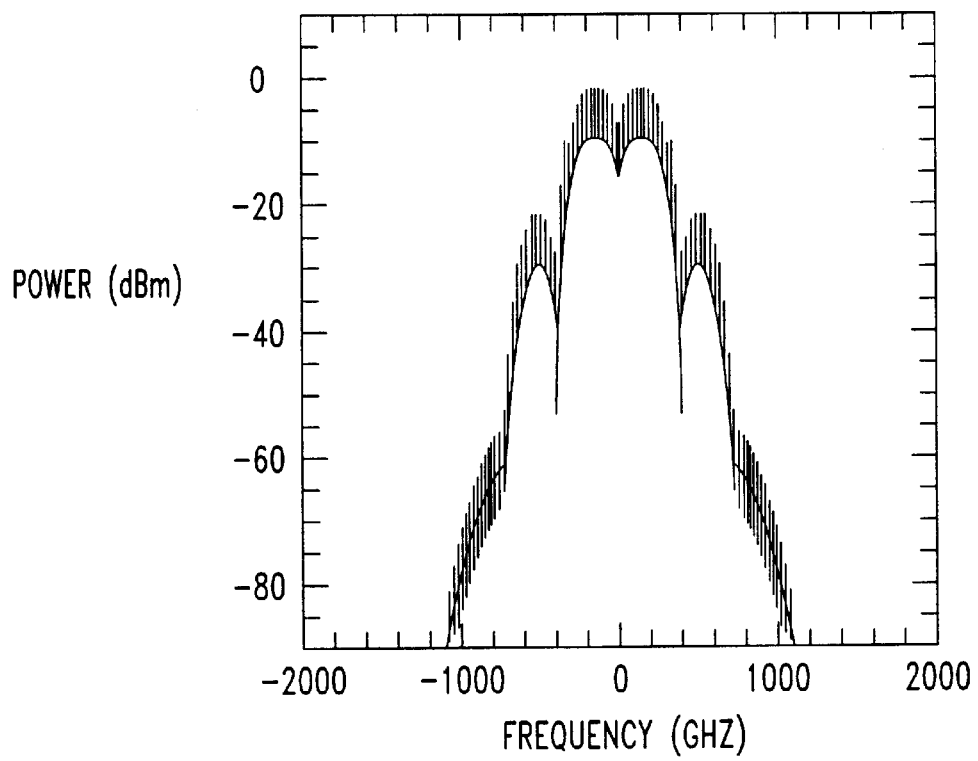
FIG. 14 shows a two-channel spectrum, each signal having 3 ps pulses.

The examples discussed above only describe single-channel transmission in which transmission signals in a given channel, i.e., frequency or wavelength range, are transmitted. FIG. 13 shows a single channel 40 Gbit/s transmission signal having 3 ps pulses similar to that described above. In contrast, FIG. 14 shows a two-channel transmission signal, in which each 40 Gbit/s channel has 3 ps pulses. The centers of the two channels are separated by 250 GHz. Thus, since the 3 ps pulses have a wide frequency bandwidth, the power in the two channels overlap in frequency to some extent.

Figure 15:
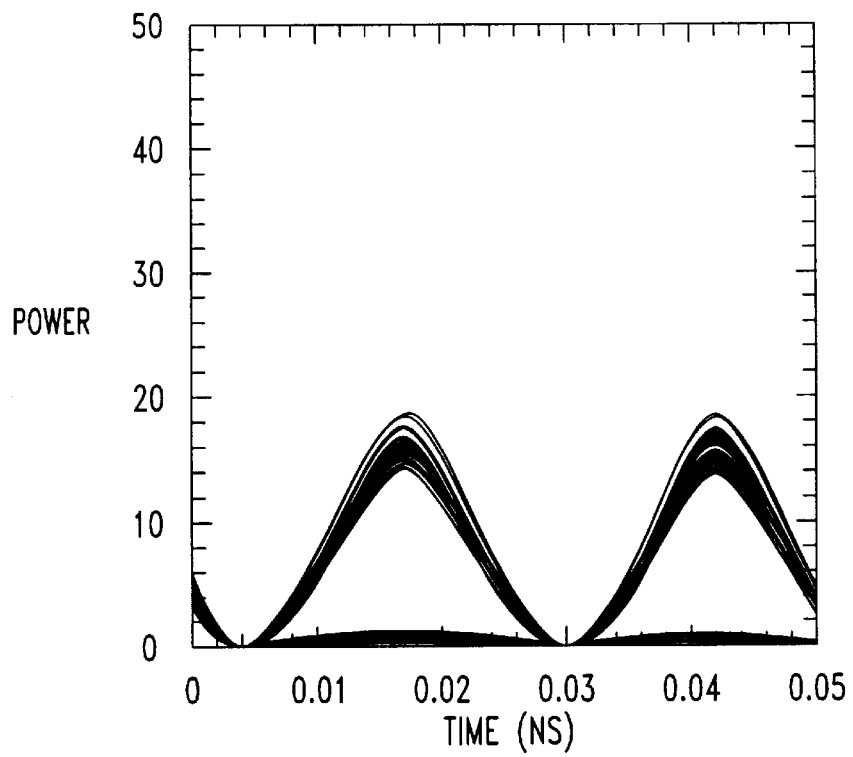
FIG. 15 shows a received signal that results after transmitting the signal of FIG. 13 over 480 km of conventional optical fiber with subsequent dispersion compensation and narrow (125 GHz) optical filtering.
Figure 16:
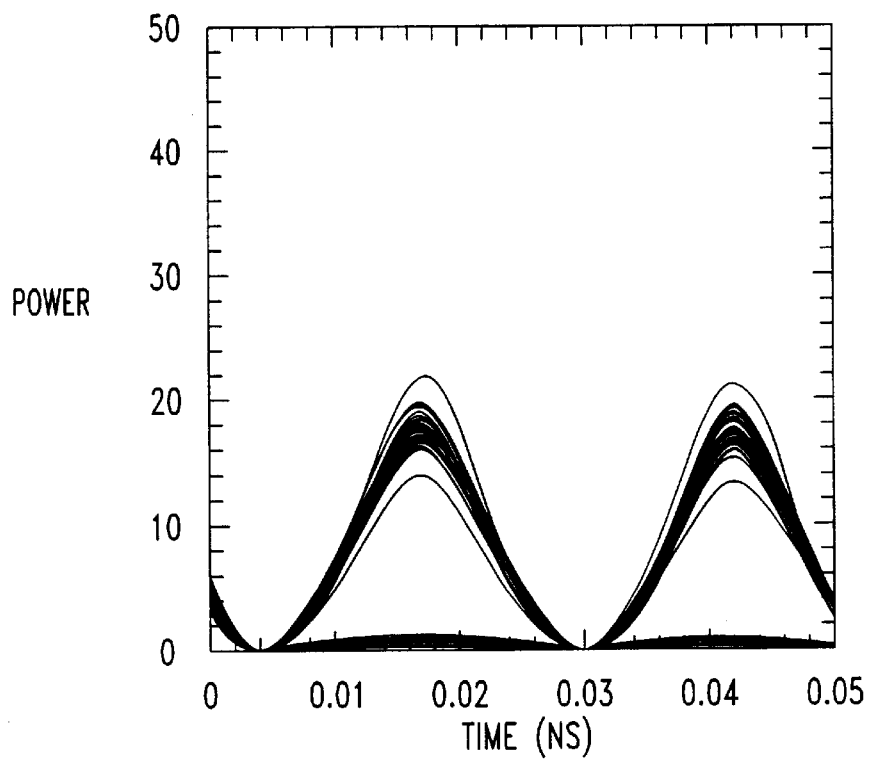
FIG. 16 shows a received signal for the first channel received after transmitting the two-channel signal of FIG. 14 over 480 km of conventional fiber, with subsequent dispersion compensation and narrow (125 GHz) optical filtering.

FIG. 15 shows the signal received after the single-channel transmission signal shown in FIG. 13 is transmitted through a transmission system identical to that used in connection with FIGS. 2–10 above. The received signal shown in FIG. 15 has been filtered using a 125 GHz bandpass optical filter and a 30 GHz low pass electrical filter and corresponds closely to that shown in FIG. 10 above since the original transmission signal and transmission system are identical. FIG. 16 shows the filtered signal for the first channel of the two channels shown in FIG. 14. FIG. 16 shows that by using narrow optical filtering at the receiver 4, two adjacent channels that overlap to a large extent can be extracted from the received signal with little loss in received signal integrity. In this example, the first channel was filtered using a narrow bandpass optical filter having a frequency passband of 125 GHz. Such narrow bandpass filters are well known in the art and can take various configurations, including Fabry-Perot interferometers, thin-film interferometers, etc. Thus, frequency overlap of adjacent channels designed to reduce the effect of non-linearities on the transmitted signals does not prevent the use of closely spaced channels, such as those used in dense wavelength division multiplexing (DWDM).

Figure 17:
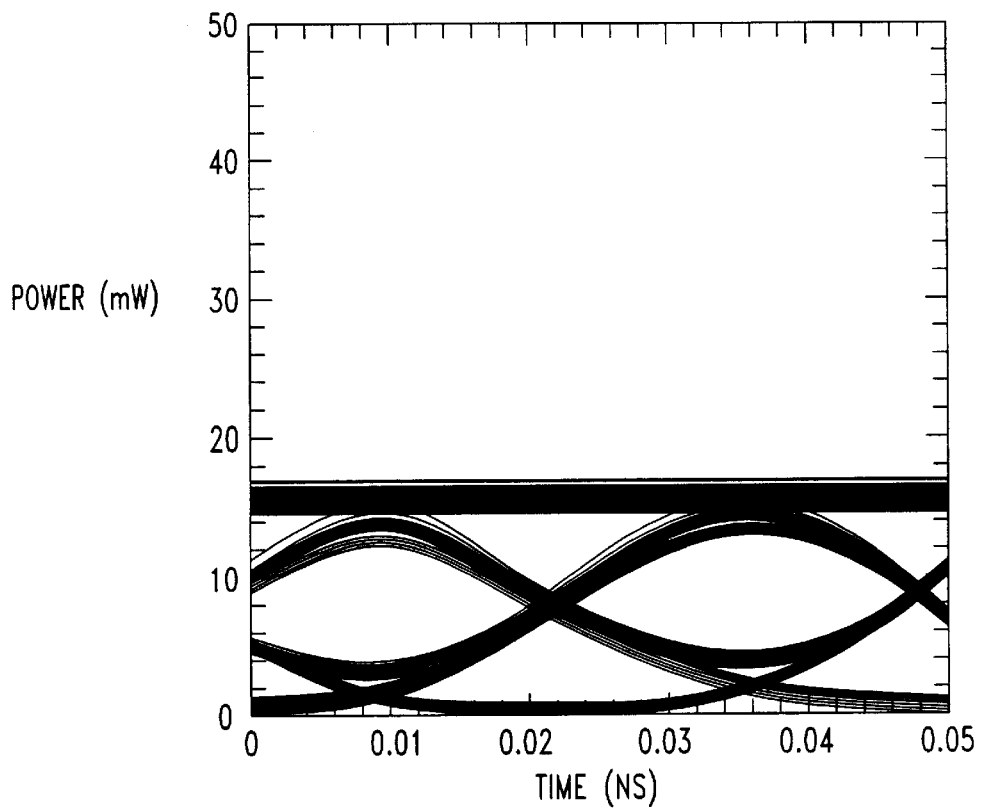
FIG. 17 shows a received signal having 3-ps pulses after transmission over 480 km of conventional optical fiber with subsequent incomplete (by 1 km) dispersion compensation and wide (1000 GHz) optical filtering.
Figure 18:
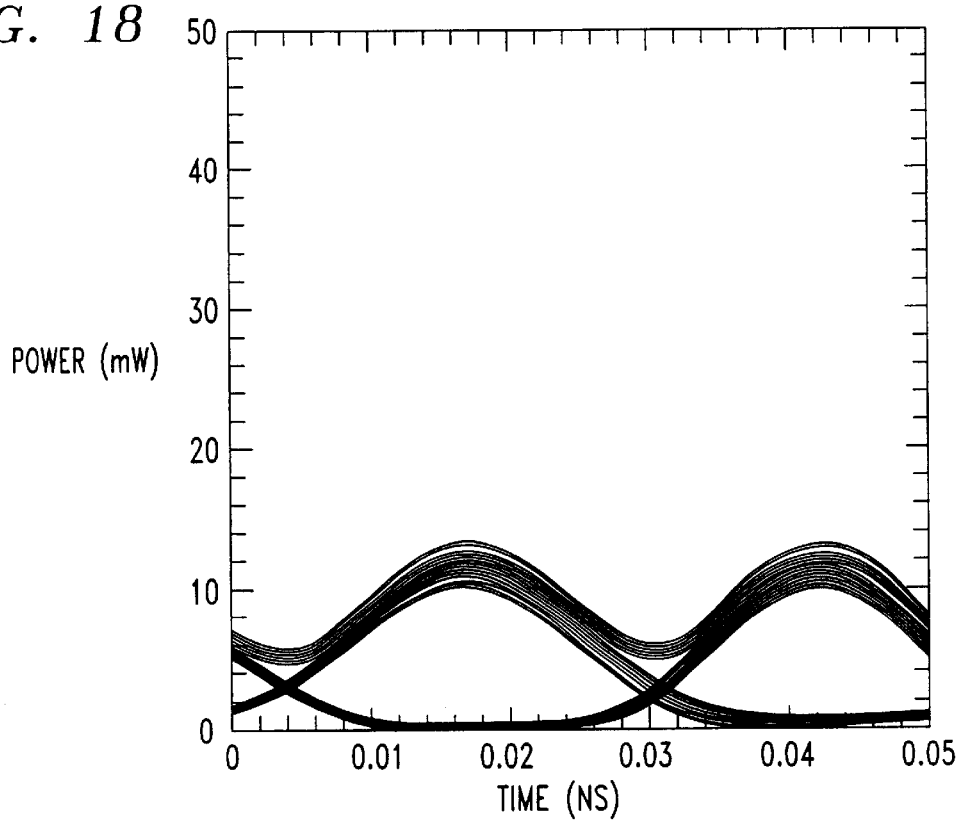
FIG. 18 shows a received signal having 3-ps pulses after transmission over 480 km of conventional optical fiber with subsequent incomplete (by 1 km) dispersion compensation and narrow (125 GHz) optical filtering.

Optical filtering at the receiver 4 can also compensate somewhat for residual dispersion and/or dispersion slope in the combined transmission link 2 and dispersion compensating link 3. For example, if the dispersion is imperfectly compensated, signal distortion occurs because the higher-frequency signal components (defined as those further from the central frequency) arrive out of phase with respect to the lower-frequency components (defined as those closer to the central frequency). By removing the higher-frequency components with an optical filter having a bandwidth less than the full signal bandwidth, this distortion can be reduced. Similarly, if the dispersion is perfectly compensated at the central frequency of the signal but there is a residual dispersion slope, then the higher frequencies of the signal are imperfectly dispersion compensated. Once again, by removing the higher-frequency components with an optical filter, this distortion can be ameliorated. FIG. 17 shows a received 40 Gbit/s optical signal using 3 ps pulses in a transmission link with dispersion undercompensated by the equivalent of 1 km of SMF. In this case the receiver 4 optical filter passband is 1000 GHz, and the electrical filter is 30 GHz. FIG. 18 shows the received signal using an optical filter passband of 125 GHz. Optical filtering has clearly reduced the dispersion penalty in the eye diagram. Of course, this technique has limitations. The optical filter bandwidth cannot be reduced below about one or two times the bitrate without severe signal distortion.

Figure 19:
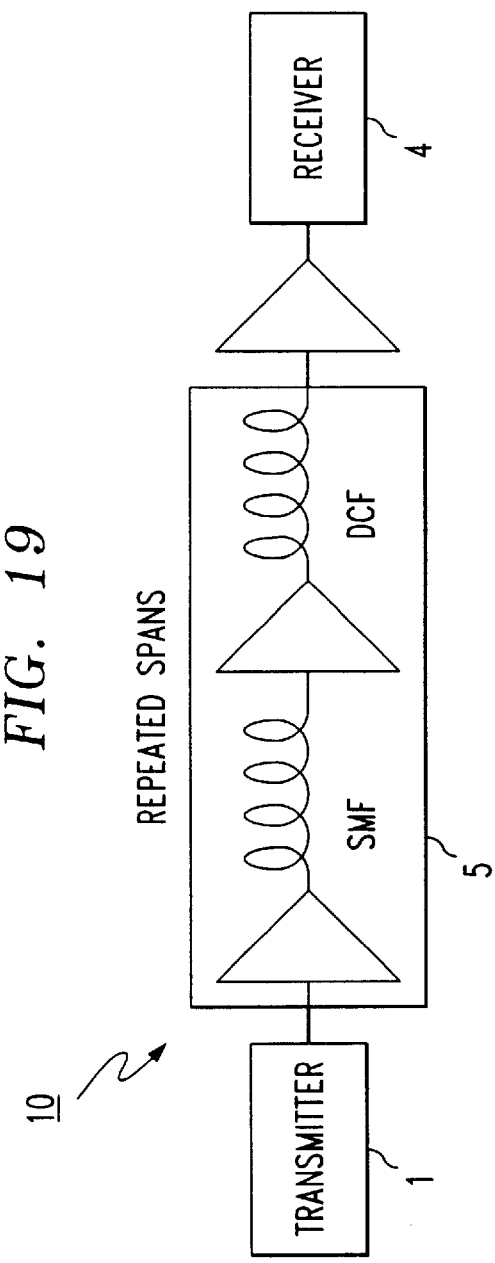
FIGS. 19 and 20 are schematic block diagrams of other possible optical communication systems for use with the invention.
Figure 20:
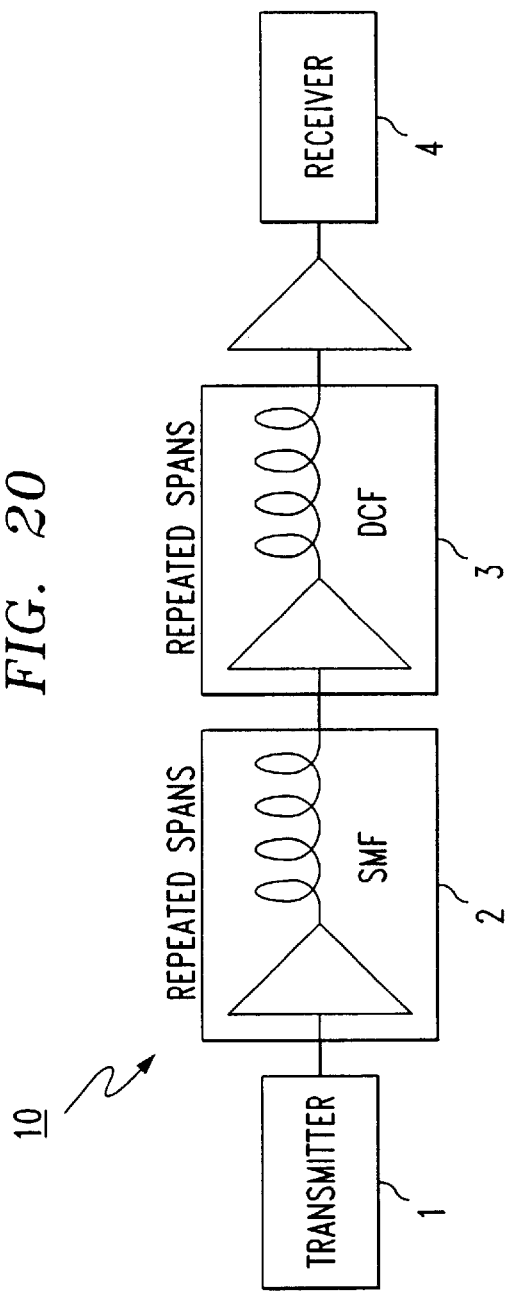

FIGS. 19 and 20 show two additional exemplary configurations for an optical communication system 10. The transmitters 1 and receivers 4 are similar to those shown in FIG. 1. In FIG. 19, the optical communication system 10 includes repeated spans 5 of single mode fiber (SMF) and dispersion compensated fiber (DCF) such that a transmitted signal output by the transmitter 1 is transmitted through the SMF, then the DCF, followed by another length of SMF, a length of DCF, etc. Although this configuration is possible, reconstruction of the transmitted signals at the end of each length of DCF reforms the signals and thus allows the non-linearities in the system to have a greater effect on the transmission signals. Thus, repeated spans 5 of the SMF and DCF may have an overall negative effect on the transmission signals compared to other arrangements as described below. The optical communication system 10 in FIG. 20 includes repeated spans of transmission links 2 having SMF followed by repeated spans of dispersion compensating links 3 including DCF. Thus, a transmitted signal output by the transmitter 1 will pass through multiple spans of the transmission link 2 and be widely dispersed, and then be passed through repeated spans of dispersion compensating links 3, such that the transmitted signals are reformed and provided to the receiver 4. This configuration may be preferable to that shown in FIG. 19 because the transmitted signals are only reformed once and then output to the receiver 4 rather than being reformed multiple times, thus allowing non-linearities to affect the transmission signals. Clearly, combinations of the systems in FIGS. 19 and 20, that is, repeated spans 2, 3, and/or 5 wherein the dispersion and dispersion slope of the overall link are appropriately compensated, are also possible.

While the invention has been described in conjunction with the specific embodiments thereof, it is evident that many alternatives, modifications and variations will be apparent to those skilled in the art. Accordingly, embodiments of the invention as set forth herein are intended to be illustrative, not limiting. Various changes may be made without departing from the spirit and scope of the invention.

What is claimed is:

1. A method for transmitting a transmission signal, comprising:
   providing an optical transmission link having a given level of dispersion;
   forming the transmission signal to be dispersion-enhanced such that the signal disperses rapidly in the transmission link;
   providing the transmission signal to the transmission link;
   compensating for the dispersion of the transmission signal; and
   receiving the signal.

2. The method of claim 1, wherein the step of providing a transmission link comprises providing a length of conventional optical fiber having a dispersion of approximately 16 picosecond/nanometer/kilometer (ps/nm/km).

3. The method of claim 1, wherein the step of providing a transmission link comprises providing a length of non-zero dispersion shifted fiber having a dispersion of approximately ±3 ps/nm/km.

4. The method of claim 1, wherein the step of forming the transmission signal comprises forming an optical pulse having a broader frequency spectrum than that required for a bit rate being used.

5. The method of claim 1, wherein the step of forming the transmission signal comprises broadening a frequency spectrum of the transmission signal beyond that required for a bit rate being used.

6. The method of claim 1, wherein the step of forming the transmission signal comprises forming a chirped optical pulse.

7. The method of claim 1, wherein the step of forming the transmission signal comprises forming a transmission signal having at least two channels such that frequency bands of signals in at least two adjacent channels overlap, and the step of receiving comprises filtering the received signal with a bandwidth less than the signal bandwidth to recover one channel.

8. The method of claim 1, wherein the step of forming the transmission signal comprises using a light source having a broadened linewidth to generate the transmission signal.

9. The method of claim 1, wherein the step of forming the transmission signal comprises using a light source having a frequency spectrum of 40–200 GHz to generate the transmission signal.

10. The method of claim 1, wherein the step of forming the transmission signal comprises using a light source having a broad frequency spectrum and selecting by optical filtering a portion of the light output by the light source to generate the transmission signal.

11. The method of claim 1, wherein the step of compensating for the dispersion comprises providing an optical dispersion compensating device that compensates for dispersion of the transmission signal.

12. The method of claim 1, further comprising optical filtering of the transmission signal after being transmitted through the transmission link with a bandwidth less than the signal bandwidth to reduce the effects of residual dispersion or dispersion slope.

13. A method for transmitting optical communication information, comprising:
   providing a transmission link having a non-zero dispersion value;
   generating a chirped transmission signal having a wide frequency band;
   providing the chirped transmission signal to the transmission link so that the transmission signal disperses rapidly in the link, thereby reducing non-linear effects on the signal;
   compensating for the dispersion of the transmission signal in the transmission link; and
   receiving the signal.

14. The method of claim 13, wherein the step of providing a transmission link comprises providing single mode optical fiber having a dispersion of approximately 16 ps/nm/km.

15. The method of claim 13, wherein the step of providing a transmission link comprises providing a length of non-zero dispersion compensated optical fiber having a dispersion of approximately ±3 ps/nm/km.

16. The method of claim 13, wherein the step of generating a chirped transmission signal comprises generating optical signals for at least two adjacent channels such that optical signals in the adjacent channels overlap in frequency.

17. The method of claim 13, further comprising providing an optical dispersion compensating device that compensates for dispersion of the transmission signal.

18. The method of claim 13, further comprising optically filtering the transmission signal after being transmitted through the transmission link.

19. The method of claim 13, further comprising optical filtering the transmission signal after being transmitted through the transmission link with a bandwidth less than the signal bandwidth to reduce the effects of residual dispersion or dispersion slope to select one of a plurality of channels from the transmission signal where the selected channel overlaps in frequency with an adjacent channel.

20. The method of claim 13, further comprising optical filtering the transmission signal after being transmitted through the transmission link with a bandwidth less than the signal bandwidth to compensate for residual dispersion or dispersion slope in the transmission link.

21. A method for transmitting a transmission signal, comprising:
   providing an optical transmission link;
   forming the transmission signal to include a plurality of channels so that at least two channels partially overlap in frequency;
   providing the transmission signal to the transmission link;
   optically filtering with a bandwidth less than the signal bandwidth the transmission signal to select one of the plurality of channels; and
   receiving the signal.

22. The method of claim 21, wherein the step of forming the transmission signal comprises forming an optical pulse having a broader frequency spectrum than that required for a bit rate being used.

23. The method of claim 21, wherein the step of forming the transmission signal comprises dispersion-enhancing the transmission signal.

24. The method of claim 21, wherein the step of forming the transmission signal comprises forming a chirped optical pulse.

25. The method of claim 21, wherein the step of forming the transmission signal comprises using a light source having a broadened line width to generate the transmission signal.

26. The method of claim 21, wherein the step of forming the transmission signal comprises using a light source having a frequency spectrum of 40–200 GHz to generate the transmission signal.

27. The method of claim 21, wherein the step of forming the transmission signal comprises using a light source having a broad frequency spectrum and selecting by optical filtering a portion of the light output by the light source to generate the transmission signal.

28. The method of claim 21, wherein the step of optically filtering the transmission signal comprises using an optical filter having a pass band that is narrower than the transmission signal frequency spectrum.

29. The method of claim 22, further comprising compensating for dispersion of the transmission signal in the transmission link.

30. A method for transmitting a transmission signal, comprising:

providing an optical transmission link;

forming the transmission signal;

providing the transmission signal to the transmission link;

optically filtering the transmission signal with a bandwidth less than the signal bandwidth to counter effects of residual dispersion or dispersion slope on the signal; and receiving the transmission signal.

* * * * *